April 29, 1952  E. G. HENRY  2,594,432
TOOL FOR STRETCHING FINGER RINGS
Filed Feb. 17, 1948
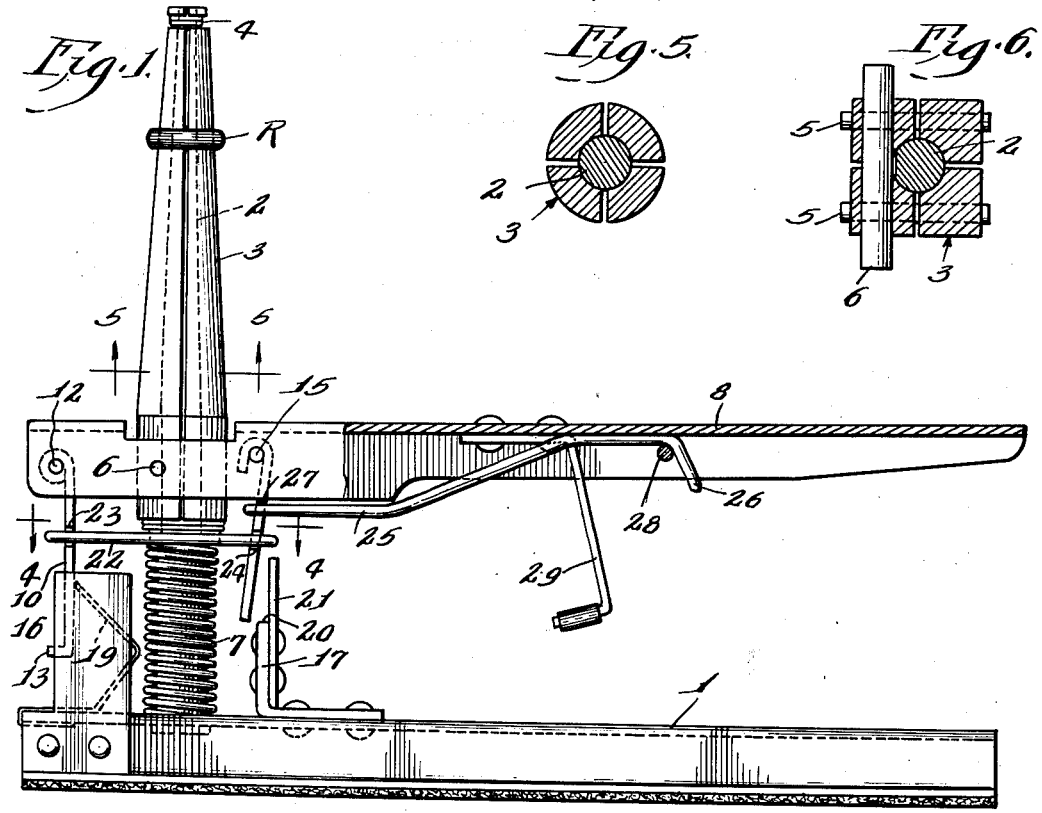
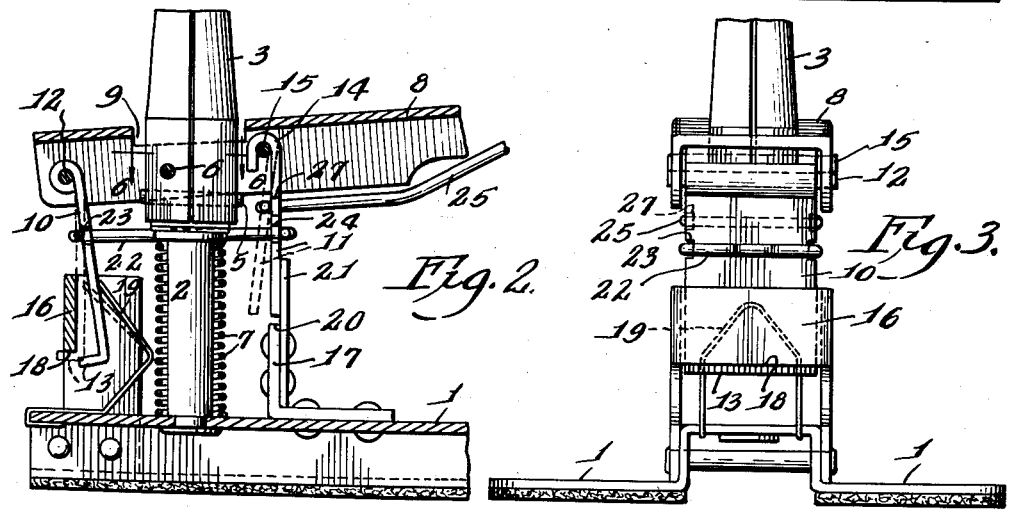
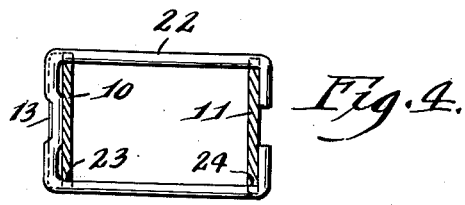
Inventor:
Carle G. Henry,
By Wm. F. Freudenreich,
Attorney.

Patented Apr. 29, 1952

2,594,432

UNITED STATES PATENT OFFICE 2,594,432

TOOL FOR STRETCHING FINGER RINGS

Earle G. Henry, Wilmette, Ill.

Application February 17, 1948, Serial No. 8,979

6 Claims. (Cl. 29—8)

In my prior application, Ser. No. 699,211, filed September 25, 1946, I have disclosed a novel tool for stretching finger rings. The present invention relates to that tool and has for its object to improve the same.

In the previous tool there is a long, fairly broad base from one end of which rises an expansible, vertically-movable tapered arbor fitted around a stationary tapered stem or mandrel; the arbor being moved up and down by means of a lever overlying and extending lengthwise of the base. With this arrangement the force for expanding or stretching a ring is created through a downward pressure on the lever; and for this reason, and because of the size of the base, the tool is supported about as solidly as though it were anchored to a stationary object.

When a ring is slipped on the arbor and the latter is forcibly drawn down to expand the same, the ring acts as a clamp to hold the arbor in intimate contact with the mandrel. As a result, the taper of the arbor being very steep, the arbor becomes frozen or locked to the mandrel after the lever has been forced down under heavy pressure; and the lever must be pulled up again to effect a release of the grip of the arbor on the mandrel. When the lever is thus raised, it is necessary to use one hand to hold the base down since, otherwise, the tool will simply be raised bodily from the bench or other support.

Specifically regarded, the present invention has for its object to improve the construction of the prior tool in such a manner that the backing off of the arbor, as well as the tightening of the same on the mandrel, may be effected by pressing the lever down; thereby giving the tool the same firm support while releasing the grip of the arbor on the mandrel as is provided during a ring stretching operation.

The various features of novelty whereby the present invention is characterized will hereinafter be pointed out with particularity in the claims; but, for a full understanding of the invention and of its objects and advantages, reference may be had to the following detailed description taken in connection with the accompanying drawings, wherein:

Figure 1 is a side view of a tool embodying the present invention, the arbor being in a down, expanded position and held there by a ring that has been tightened on the arbor, the lever being partly in section; Fig. 2 is a view showing one end of the tool in longitudinal, vertical section, with the lever and associated parts shown in different positions than in Fig. 1; Fig. 3 is an end view of the tool; and Figs. 4 and 5 are sections, on a little larger scale, on lines 4—4 and 5—5 of Fig. 1, respectively. Fig. 6 is a cross-section of the tool showing the pivot pin by which it connected to the lever.

Referring to the drawing, I represent a long flat base from which, near one end, rises a stationary tapered stem or mandrel 2. Surrounding the mandrel is a tapered arbor 3 divided longitudinally into four sections, yieldingly held together at the small upper end of the arbor by a spring 4. Parallel pins 5, 5 and a pivot pin 6, at right angles thereto connect the lower ends of the arbor sections together in a manner to enable each section to move toward and from each adjacent section. A strong coiled spring 7 surrounds the mandrel or stem below the arbor and tends constantly to force the arbor up.

All of the parts 1 to 7, just described, may be identical with corresponding parts in the device of my aforesaid application.

As in the earlier tool, the arbor is moved up and down through a limited distance by a long flanged lever 8 above and extending throughout the length of the base; the lever having in the web portion a hole 9 through which the arbor extends, and having in its side flanges openings through which end portions of the pivot pin 6 project.

In the present tool, instead of having a single fulcrum at the end of the lever near the arbor, I provide two fulcrums, one at the end of the lever and the other placed far back so that the pivotal axis of the connection with the arbor lies in between them. Therefore a down swing of the lever moves the arbor either up or down, depending on which of the two fulcrums is in use.

In the particular arrangement illustrated, there are two stiff plates, 10 and 11, hung from the lever, one on the outer side of the arbor and the other on the inner side. Plate 10 may be attached to the lever by a simple hinge pintle 12 which allows only swinging movements. At the lower end of this plate is an out-turned lip 13. Plate 11 has its upper end bent to form an inverted U 14 between the arms of which extends a pin 15 fixed to the lever; the parts being so proportioned that the plate may move bodily up and down relatively to the lever and bear directly against an overhead part of the latter when this plate serves as a strut upon which the lever rocks.

Rising from the base, one outwardly and the other inwardly from the lower end of the stem or mandrel 2, are two brackets, 16 and 17.

Bracket 16 is cut away to provide a transverse, downwardly facing shoulder 18, with a free space between the same and the base. When the lever is raised a little above the horizontal position, plate 10 may be swung outwardly until lip 13 underlies shoulder 18. A spring 19 tends constantly to press plate 11 into interlocked relation with bracket 16.

Bracket 17 is cut off square at the top to provide an upwardly facing shoulder 20 that lies directly below plate 11 whenever the latter hangs in a vertical position. Bracket 17 has a thin stop plate 21 that rises above shoulder 20 on the inner side of the latter; this stop plate preventing plate 11 from swinging inward past the bracket.

Plates 10 and 11 are loosely connected to prevent them from swinging apart too far, although each can swing freely toward each other as far as the intervening mandrel permits. This connection is conveniently a wire bent into the shape of a rectangular frame 22 or, roughly, an O, that embraces both of these plates. The plates have in their side, vertical edges wide notches 23 and 24, respectively, in which the adjacent portions of the wire frame loosely fit.

The parts are so proportioned that the lower ends of plates 10 and 11 cannot spread apart far enough to interlock both with their corresponding brackets. In other words, the lip 13 may underlie shoulder 18 and plate 11 may rest on shoulder 20, but not both at the same time.

Consequently, only one fulcrum at a time can be in use.

The fulcrum plates, one a link (because it pulls up against shoulder 18), and the other a strut (because it presses down on shoulder 20), can be shifted in one direction by spring 19. To disconnect link member 10 from bracket 16 and bring strut member 11 into operative relation to bracket 17, I place a pull device 25 on the under side of the lever, one end of the device being loosely engaged with member 11 and the other end terminating in a downwardly bent finger piece or trigger 26. Member 25 may be a piece of wire bent into an elongated narrow loop that embraces plate 11 and lies in notches 27, similar to and above notches 24, in the edges of plate 11. A transverse pin 28, extending between the flanges of the lever below the pull member, hold the inner end of the latter up.

If desired, the lever may be provided with a foot 29 that comes to rest before the lever can descend far enough to pinch a hand grasping the same.

In Fig. 1 of the drawing, the arbor has been expanded within a ring R with sufficient force to cause the arbor to grip the stem or mandrel so strongly that spring 7 is powerless to raise the arbor. Strut 11 is out of registration with the supporting shoulder 20, and lip 13 on link 10 lies underneath shoulder 18. The lever may now be swung up, dropping lip 13 below shoulder 18, as shown in dotted lines in Fig. 2. A pull on the finger piece 26 then serves to swing the fulcrum elements 10 and 11 into the positions in which they appear in full lines in Fig. 2; link element 10 being rendered idle and strut member 11 being held against stop plate 21 so as to be in position to come to rest on shoulder 20 when the lever is pressed down.

With the parts in the full line positions of Fig. 2, downward pressure on the lever causes it to rock on the upper end of strut 11 which now becomes the active fulcrum for the lever. Therefore, since pivot pin 6 lies outwardly from the active fulcrum, it, together with the arbor, must move up as the long arm of the lever is forced down. In other words, the same downward arbor-expanding movement of the lever that pulled the arbor down into the position shown in Fig. 1, now pushes the arbor up and contracts it. In both instances the pressure on the base is in the downward direction, so that the tool stands firm at all times and only one hand is needed to operate it.

When there is no ring on the arbor then, with the parts otherwise in the positions shown in Fig. 1, the lever may be rocked up and down freely and, when released, it will be held up by spring 7; so that the arbor is normally in a contracted condition, ready to receive a ring. It will of course be understood that spring 7 is under an initial compression, so that it exerts an upward pull on link 10 while the tool is standing empty, with lip 13 hooked under shoulder 18; thus keeping the link normally in working position, while the strut is idle.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. The combination with a finger ring stretcher comprising a base, a device wherein an upright longitudinally divided tapered arbor expands when moved down and contracts when moved up, a spring tending constantly to hold the arbor up, and a lever pivotally connected to the lower end of the arbor to move the same up and down: of a pair of fulcrum elements hinged to the lever in spaced relation lengthwise of the latter on opposite sides of the pivotal connection between the lever and the arbor, shoulders on the base, one for each fulcrum element, for cooperation with such elements, and means selectively to shift the fulcrum elements to bring either into operative relation to the corresponding shoulder while the other is held in an inoperative position; whereby movement of the lever in one direction causes the arbor to move in either direction depending on which fulcrum element is operative at the time.

2. The combination with a finger ring stretcher comprising a base, a device wherein an upright longitudinally divided tapered arbor expands when it is moved down and contracts when it is moved up, a spring tending constantly to hold the arbor up, and a lever having much nearer one end than the other a pivotal connection with the lower end of the arbor to move the same up and down: fulcrums in the form of a depending link and a depending strut hinged to the lever in spaced relation lengthwise of the latter and on opposite sides of the pivotal connection between the lever and the arbor, means connecting the link and the strut and limiting their relative spreading movements, an upwardly facing shoulder on the base adapted to serve as a rest for the lower end of the strut in the working position of the latter, the link having at its lower end a lip projecting from the side farthest from the strut, an element on the base having a downwardly facing shoulder adapted to overlie the lip on the link in the working position of the latter, the shoulders being so spaced that only one of them at a time can be engaged with its cooperating fulcrum, and means to shift said fulcrums to bring either into its working position with respect to the corresponding shoulder while the other is carried out of its working position and away from the shoulder with which it cooperates, 3. The combination as set forth in claim 2, having, in addition, a spring acting on the link and tending constantly to move it into its working position.

4. The combination as set forth in claim 2, wherein the hinge connection between the lever and the strut is a loose one to permit the lever to bear directly against the upper end of the strut when the lever is pressed down while the strut is in its working position.

5. The combination as set forth in claim 2, wherein the connection between the fulcrums is an O-shaped member that embraces both, and wherein the fulcrums have notches in their sides into which adjacent portions of said members slidably fit.

6. The combination with a finger ring stretcher comprising a base, a device wherein an upright longitudinally divided tapered arbor expands when it is moved down and contracts when it is moved up, a spring tending constantly to hold the arbor up, and a lever having much nearer one end than the other a pivotal connection with the lower end of the arbor to move the same up and down: fulcrums in the form of a depending link and a depending strut hinged to the lever in spaced relation lengthwise of the latter and on opposite sides of the pivotal connection between the lever and the arbor, means connecting the fulcrums to allow them to swing toward each other while limiting their relative spreading movements, an upwardly facing shoulder on the base adapted to serve as a rest for the lower end of the strut in the working position of the latter, the link having at its lower end a lip projecting from the side farthest from the strut, an element on the base having a downwardly facing shoulder adapted to overlie the lip on the link in the working position of the latter, the shoulders being so spaced that only one of them at a time can be engaged with its cooperating fulcrum, means on the lever connected to the strut to shift it into its working position with respect to the corresponding shoulder and at the same time pull the link out of its working position and away from the shoulder with which it cooperates, and a spring tending constantly to hold the link in its working position.

EARLE G. HENRY.

REFERENCES CITED

The following references are of record in the file of this patent:

UNITED STATES PATENTS

| Number | Name | Date |
| --- | --- | --- |
| 1,060,337 | Graves | Apr. 29, 1913 |

FOREIGN PATENTS

| Number | Country | Date |
| --- | --- | --- |
| 125,841 | Germany | Dec. 14, 1901 |